US009488060B2

(12) United States Patent
Bowman (10) Patent No.: US 9,488,060 B2
(45) Date of Patent: Nov. 8, 2016

(54) SYSTEMS AND METHODS FOR DYNAMICALLY SEALING A TURBINE ENGINE

(71) Applicant: General Electric Company, Schenectady, NY (US)

(72) Inventor: Michael John Bowman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 541 days.

(21) Appl. No.: 14/049,967

(22) Filed: Oct. 9, 2013

(65) Prior Publication Data

US 2015/0098806 A1   Apr. 9, 2015

(51) Int. Cl.
*F01D 9/02* (2006.01)
*F01D 11/22* (2006.01)
*F01D 11/12* (2006.01)
*F16J 15/44* (2006.01)

(52) U.S. Cl.
CPC .............. *F01D 9/02* (2013.01); *F01D 11/122* (2013.01); *F01D 11/22* (2013.01); *F16J 15/445* (2013.01); *Y10T 29/49316* (2015.01)

(58) Field of Classification Search
CPC .......... F01D 11/20; F01D 11/22; F01D 9/02; F16J 15/445

USPC ...................................................... 415/171.1
See application file for complete search history.

(56) References Cited

U.S. PATENT DOCUMENTS

| 3,603,599 | A | 9/1971 | Laird |
|---|---|---|---|
| 6,769,865 | B2 | 8/2004 | Kress et al. |
| 7,040,861 | B2 | 5/2006 | Clifford et al. |
| 8,256,228 | B2 * | 9/2012 | O'Leary .................. F01D 11/22 415/116 |
| 2007/0132193 | A1 * | 6/2007 | Wolfe ..................... F16J 15/445 277/415 |
| 2007/0248452 | A1 * | 10/2007 | Brisson .................. F01D 11/06 415/10 |
| 2008/0042367 | A1 | 2/2008 | Chevrette |
| 2012/0027573 | A1 | 2/2012 | Ali et al. |

* cited by examiner

*Primary Examiner* — Craig Kim
*Assistant Examiner* — Michael Sehn
(74) *Attorney, Agent, or Firm* — Armstrong Teasdale LLP (57) ABSTRACT

A turbine engine assembly is provided. The turbine engine assembly includes a stator assembly and a rotor assembly having a rotor disk coupled to a plurality of rotor blades, the plurality of rotor blades extending radially outward from the rotor disk. The assembly also includes a casing that at least partially circumscribes the plurality of rotor blades. The assembly also includes a dynamic sealing device coupled to the stator assembly. The at least one dynamic sealing device is configured to insert a seal between the casing and the plurality of rotor blades to facilitate reducing a clearance gap defined between the plurality of rotor blades and the casing while the rotor assembly is operating.

20 Claims, 5 Drawing Sheets

SYSTEMS AND METHODS FOR DYNAMICALLY SEALING A TURBINE ENGINE

BACKGROUND

The field of the disclosure generally relates to turbine engines, and more specifically to systems and methods for dynamically sealing a turbine engine.

A turbine engine generally includes a rotor assembly and a stator assembly. At least some known rotor assemblies include at least a disk coupled to a plurality of rotor blades, sometimes referred to as airfoils, that extend radially outward from the disk to a tip. In known turbine engines, the rotor blades are circumferentially bound by a casing that defines an interior surface of the turbine assembly. In operation a fluid, such as, air, steam, or combustion gases, for example, interact with the rotor blades to produce useful work. For example, the turbine engine may power a compressor, an electrical generator, and/or an electrical load.

Further, in known turbines, an area between the tip of the rotor blades and the casing, referred to as a clearance gap, may enable the fluid to undesirably flow around the rotor blades without interacting with them. Fluid flowing through the clearance gap does not produce any useful work, and as such, the clearance gap is an important characteristic in determining the efficiency of a turbine engine. More specifically, an inverse relationship exists between the size of the clearance gap and the efficiency of the turbine engine. For example, an engine with a relatively large clearance gap is generally less efficient, while an engine with a relatively small clearance gap is generally more efficient. As such, at least some known systems position a seal between the casing and the tip of the rotor blades during manufacturing, the seal decreasing the size of the clearance gap to improve turbine engine efficiency.

However, turbine engines do not have a static clearance gap at all stages of operation. More specifically, the amount of clearance associated with known turbine engines may fluctuate based on the operating condition associated with the turbine engine. For example, the clearance gap may change between start-up, idling, steady-state, shutdown, and transient operations due to rotor blade growth, for example. If the size of the clearance gap is manufactured too tightly, the rotor blades may rub against the casing and/or against the seal during various operating conditions, which may damage the engine and/or decrease efficiency. As such, known turbines and seals are typically manufactured with sufficient clearance to accommodate for the maximum extension of the rotor blades, including during various turbine operations.

In addition, in known turbines, replacing damaged seals may be an expensive and time-consuming endeavor that requires the turbine to be non-operational and/or at least partially disassembled.

BRIEF DESCRIPTION

In an aspect, a turbine engine assembly is provided. The turbine engine assembly includes a stator assembly and a rotor assembly having a rotor disk coupled to a plurality of rotor blades, the plurality of rotor blades extending radially outward from the rotor disk. The assembly also includes a casing that at least partially circumscribes the plurality of rotor blades. The assembly also includes a dynamic sealing device coupled to the stator assembly. The at least one dynamic sealing device is configured to selectively insert a seal between the casing and the plurality of rotor blades to facilitate reducing a clearance gap defined between the plurality of rotor blades and the casing while the rotor assembly is operating.

In another aspect, a dynamic sealing device for use in a turbine engine is provided. The dynamic sealing device is configured to selectively insert, during operation of the turbine engine, a seal between a plurality of rotor blades and a casing of a stator assembly. The plurality of rotor blades extend radially outward from a rotor disk of a rotor assembly, the casing circumscribes the plurality of rotor blades, and the seal facilitates reducing a clearance gap defined between said plurality of rotor blades and said casing.

In another aspect, a method for facilitating sealing a turbine engine is provided. The method includes selectively inserting, with a dynamic sealing device, a seal between a plurality of rotor blades and a casing of a stator assembly while the turbine engine is operating. The plurality of rotor blades extend radially outward from a rotor disk of a rotor assembly, the casing circumscribes the plurality of rotor blades, and said seal facilitates reducing a clearance gap defined between the plurality of rotor blades and the casing.

DETAILED DESCRIPTION OF THE INVENTION

The embodiments described herein provide turbine engine assemblies that include a dynamic sealing device that may be used to facilitate improving the efficiency of a turbine engine. More specifically, the turbine engine assembly described herein includes a rotor disk and a plurality of rotor blades extending radially outward from the rotor disk. The turbine also includes a casing that at least partially circumscribes the rotor blades. A clearance gap is defined between the casing and the outer tips of the rotor blades. At least one dynamic sealing device enables the clearance gap to be dynamically changed to adjust the clearance gap and facilitate improving turbine efficiency and/or turbine durability. In at least some implementations, the dynamic sealing device may insert and/or remove a seal from the turbine engine during operation of the turbine engine.

Dynamically inserting and removing the seal from the turbine engine enables the clearance gap to be adjusted during specific operations of the turbine engine. In one implementation, the dynamic sealing device is coupled to a controller and to a sensor that measures at least one characteristic associated with the operating condition of the turbine engine. In such an implementation, the dynamic sealing device facilitates improving the efficiency of the turbine engine by inserting a seal that reduces the turbine clearance gap during steady-state operating conditions of the turbine engine. In another implementation, the dynamic sealing device facilitates improving the durability and dependability of the seal and/or the turbine engine by removing the seal from the turbine engine during predefined engine operating conditions, such as, start-up conditions, transient conditions, and shut-down conditions, for example. In another implementation, the dynamic sealing device enables the seal to be removed from the turbine engine via a manual request.

Figure 1:
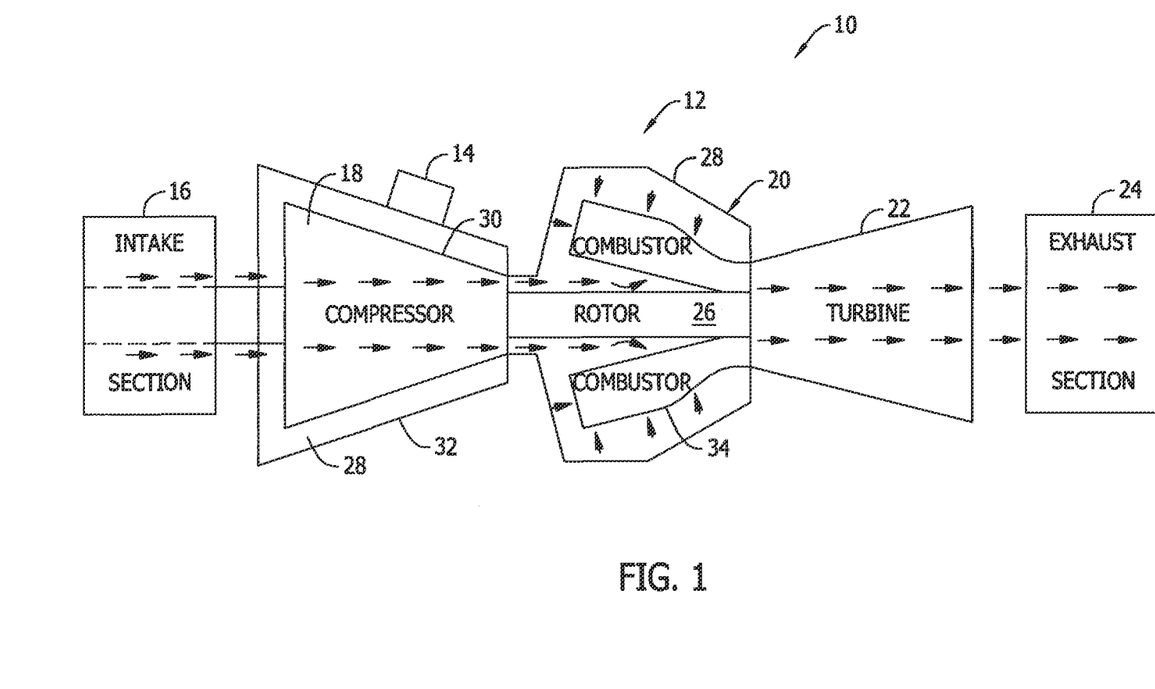
FIG. 1 is a schematic illustration of an exemplary turbine engine assembly including a dynamic sealing device.

FIG. 1 illustrates an exemplary turbine engine assembly 10 including a gas turbine engine 12 and at least one dynamic sealing device 14. In the exemplary embodiment, turbine engine 12 includes an air intake section 16, compressor 18, combustor section 20, a turbine 22, and an exhaust section 24. Compressor 18, combustor section 20, and turbine 22 are all coupled to a central rotor shaft 26. Gas turbine engine 12 also includes a casing 28 that at least partially circumscribes compressor 18, turbine 22, and rotor shaft 26. Casing 28 includes an inner casing surface 30 and an outer casing surface 32. In the exemplary embodiment, dynamic sealing device 14 is coupled to outer casing surface 32.

As indicated by arrows, air enters gas turbine engine 12 through intake section 16 and flows into compressor 18. Compressor 18 includes multiple stages (not shown in FIG. 1) of rotor blades (not shown in FIG. 1) that compress the air prior to the air being channeled into combustor section 20. Combustor section 20 includes a set of combustors 34 between compressor 18 and turbine 22. Compressed air from compressor 18 enters combustors 34 and is mixed with fuel prior to being ignited to create an exhaust flow of hot combustion gases that drive rotor blades in turbine 22. More specifically, the hot combustion gases flow through the rotor blades of turbine 22 and drive rotor shaft 26 to power compressor 18 and/or an electric generator (not shown). The hot combustion gases are discharged from turbine engine 12 through exhaust section 24. In the exemplary embodiment, gas turbine engine 12 includes at least one seal (not shown in FIG. 1) that is coupled to dynamic sealing device 14 and inner casing surface 30. The at least one seal facilitates reducing leakage of gases around the rotor blades in compressor 18 and/or turbine 22.

Figure 2:
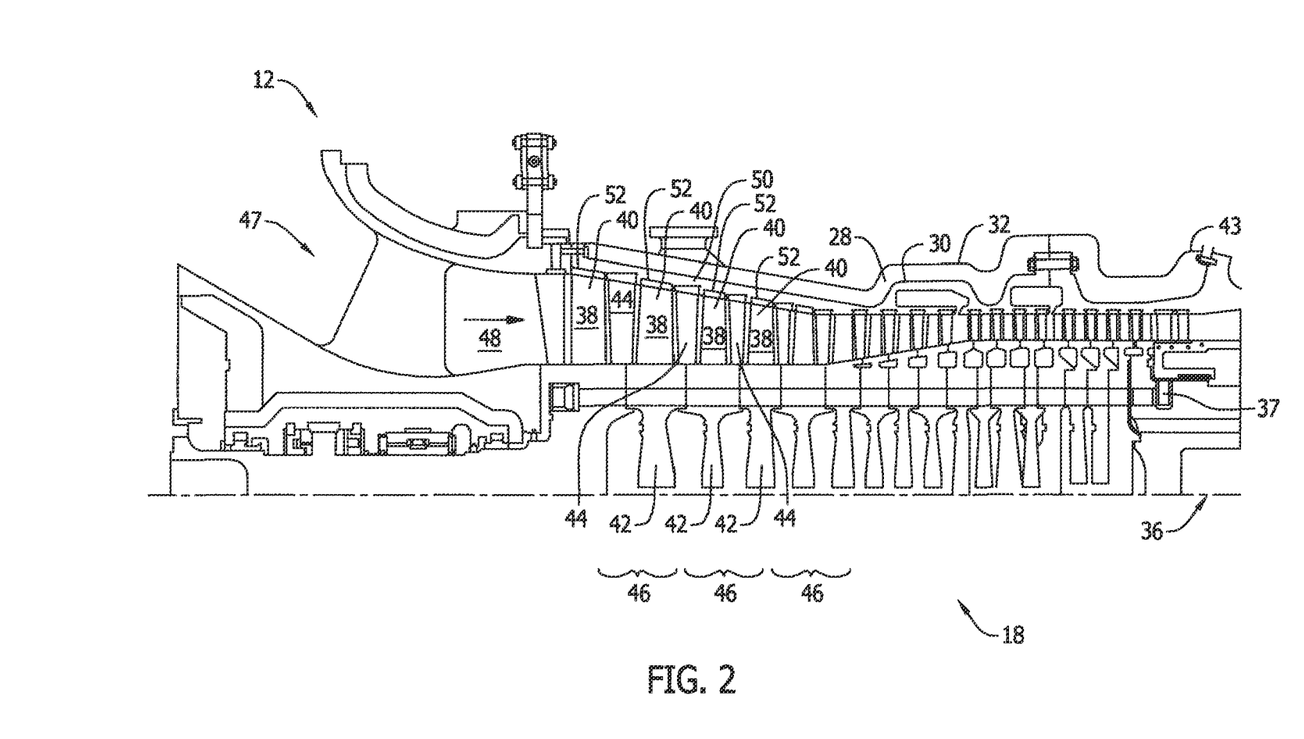
FIG. 2 is a cross-sectional view of the turbine engine assembly shown in FIG. 1 and taken along a longitudinal axis of the turbine engine.

FIG. 2 is a cross-sectional view of gas turbine engine 12 taken through a longitudinal axis 36 extending through gas turbine engine 12. In the exemplary embodiment, gas turbine engine 12 includes a rotor assembly 37 having a plurality of circumferentially-spaced rotor blades 38 with tips 40. Rotor blades 38 extend radially outward from a rotor disk 42 coupled to rotor shaft 26 (shown in FIG. 1) towards a stator assembly 43 coupled to casing 28. Stator vanes 44 are positioned adjacent to each set of rotor blades 38, and work in combination with blades 38 to form a rotor stage 46. Each stage 46 directs a flow of compressed air 47 through compressor 18. More specifically, compressor 18 defines an annular flow area 48 that extends between inner casing surface 30 and rotor disk 42, and each stage 46 directs a flow of compressed air 47 through annular flow area 48. Rotor blades 38 are at least partially circumscribed by casing 28, such that an annular gap, herein referred to as a clearance gap 50 is defined between inner casing surface 30 and tip 40 of each rotor blade 38.

A seal 52 is inserted between each rotor blade 38 and inner casing surface 30 to facilitate reducing compressed air 47 from bypassing rotor blades 38. Specifically, in the exemplary embodiment seal 52 is inserted between compressor casing 28 and rotor blades 38 to substantially seal clearance gap 50. As described in more detail below, seal 52 may be inserted and/or removed via dynamic sealing device 14 (not shown in FIG. 2) to facilitate adjusting clearance gap 50. In the exemplary embodiment, seal 52 may be employed in a plurality of stages 46. Alternatively, seal 52 may be employed in only a single stage 46. In the exemplary embodiment, seal 52 may fabricated from any material e.g., without limitation, a metallic material, a ceramic material, a plastic material, a rubber material, and/or any combination thereof In some implementations, seal 52 is at least partly flexible.

Although described with respect to a multi-stage gas turbine 12, seal 52 and dynamic sealing device 14 may be used in a single stage gas compressor, a steam turbine, or any other turbine that enables turbine engine assembly 10 to operate as described herein. Furthermore, although described as being used with a compressor section 18, dynamic sealing device 14 may be used in turbine 22 and/or in any other location that enables turbine engine assembly 10 to operate as described herein.

Figure 3:
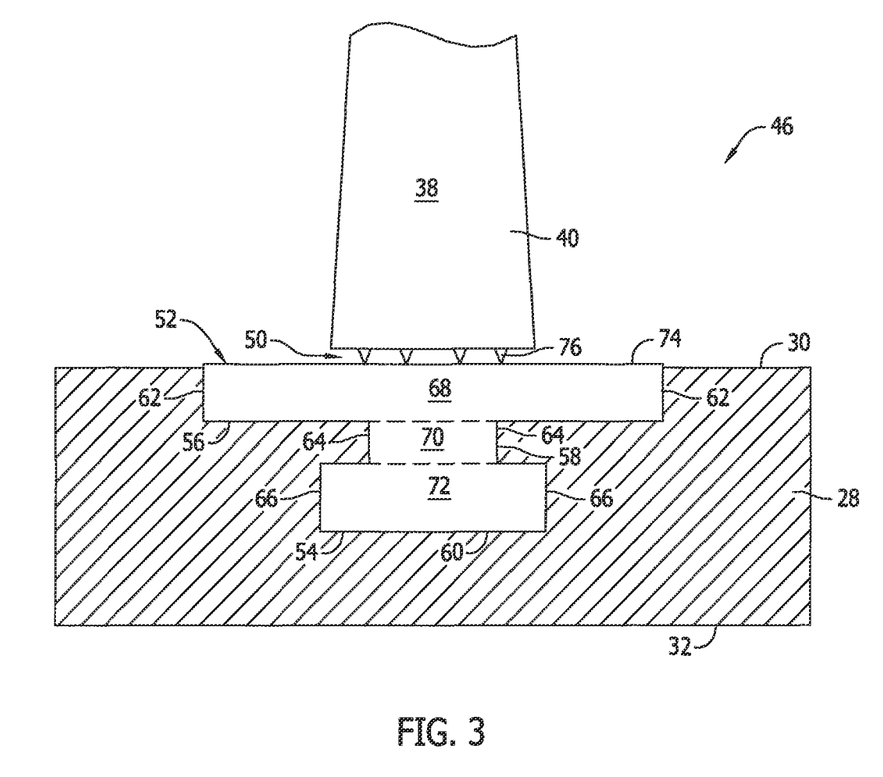
FIG. 3 is an axial view of an exemplary compressor stage used with the turbine engine assembly shown in FIG. 1.

FIG. 3 is an axial view of a stage 46 of compressor 18 including casing 28, rotor blade 38, and seal 52. In the exemplary embodiment, an annular retaining groove 54 is defined in, and extends about the periphery of casing 28. More specifically, retaining groove 54 is defined in inner casing surface 30, and is sized and oriented to receive replaceable seal 52 therein. Retaining groove 54 includes a radially inner groove 56, a radially intermediate groove 58, and a radially outer groove 60.

In the exemplary embodiment, inner groove 56 is defined by a pair of opposed inner side walls 62 that are substantially parallel to each other. Intermediate groove 58 is defined by a pair of intermediate side walls 64 that are substantially parallel to each other. Similarly, outer groove 60 is defined by a pair of opposite outer side walls 66 that are substantially parallel to each other. In the exemplary embodiment, inner side walls 62, intermediate side walls 64 and outer side walls 66 are oriented such that retaining groove 54 is substantially T-shaped. More specifically, inner groove 56 extends axially a longer distance than intermediate groove 58, and intermediate groove 58 extends axially a shorter distance than outer groove 60. Alternatively, retaining groove 54 may have any shape or orientation that enables seal 52 to function as described herein.

Further, in the exemplary embodiment, seal 52 is removably coupled to casing 28 by retaining groove 54, and includes a radially inner portion 68 a radially outer portion 72 and a neck portion 70 extending there-between. Radially inner portion 68, neck portion 70 and radially outer portion 72 extend circumferentially about casing 28. In the exemplary embodiment, neck portion 70 is narrower in width than radially inner portion 68 and radially outer portion 72 to facilitate retaining seal 52 within retaining groove 54. In particular, radially inner portion 68 is axially constrained by inner side walls 62, neck portion 70 is axially constrained by intermediate side walls 64, and radially outer portion 72 is axially constrained by outer side walls 66. Alternatively, seal 52 may be any size or shape that enables seal 52 to be removably coupled to casing 28.

Also, in the exemplary embodiment, radially inner portion 68 of seal 52 has a radially inner seal surface 74. Clearance gap 50 is defined between seal surface 74 and rotor blade tip 40. In some embodiments, rotor blade 38 includes a plurality of sealing teeth 76 that extend radially outward from tip 40. Sealing teeth 76 facilitate reducing leaks through clearance gap 50. In one implementation sealing teeth 76 contact seal surface 74 to further reduce clearance gap 50.

Figure 4:
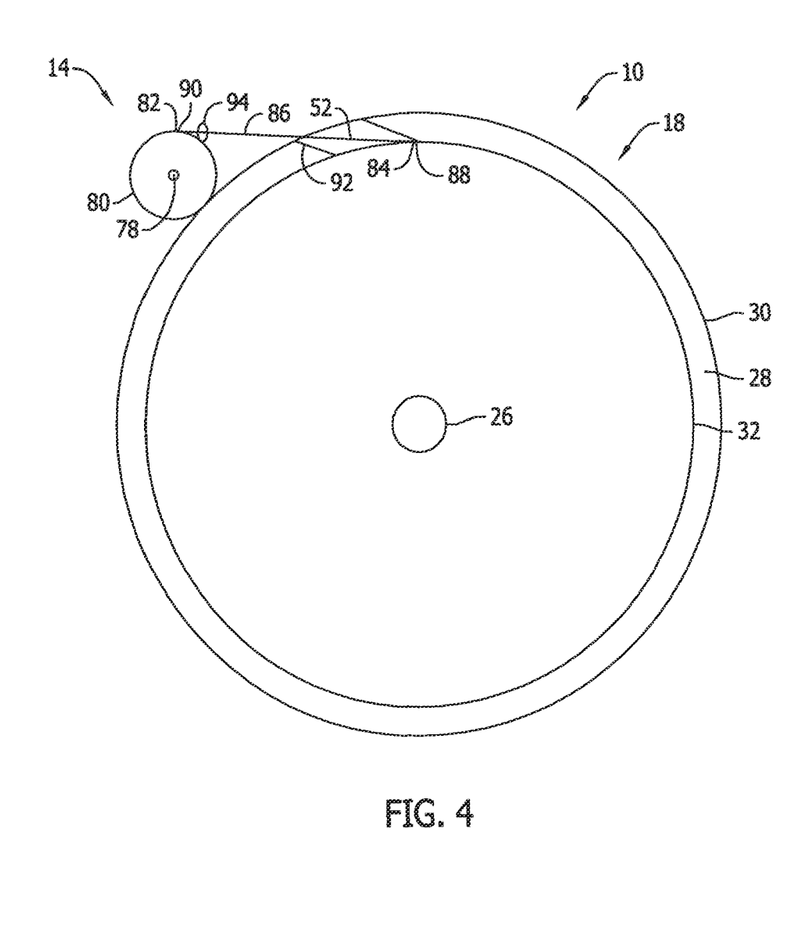
FIG. 4 is an axial cross-sectional view of the turbine engine assembly shown in FIG. 1.

FIG. 4 is an axial cross-sectional view of turbine engine assembly 10 that includes a dynamic sealing device 14 coupled to a compressor stage 46. In the exemplary embodiment, dynamic sealing device 14 is coupled to outer casing surface 32 of compressor 18. Dynamic sealing device 14 includes seal 52, rotatable shaft 78, and spool 80. Seal 52 includes a seal body 86 that extends from a first end 82 to a second end 84. First end 82 is coupled to spool 80 and second end 84 is selectively movable to any position between a fully inserted position 88 and a fully withdrawn position 90. More specifically, as second end 84 is inserted into compressor 18 and moves towards fully inserted position 88, seal body 86 substantially circumscribes rotor shaft 26 to facilitate reducing clearance gap 50 (shown in FIG. 3). As second end 84 is withdrawn from fully withdrawn position 90, seal body 86 is at least partly removed from compressor 18 and does not circumscribe rotor shaft 26. In at least one embodiment, second end 84 may form a spiral with a cut to enable seal body 86 to fully circumscribe rotor shaft 26 when second end 84 is fully inserted in compressor 18.

In the exemplary embodiment, spool 80 is coupled to rotatable shaft 78 such that the rotatable shaft 78 operates to wind and unwind seal 52 from spool 80. In one implementation, the rotation of rotatable shaft 78 in a first direction causes seal 52 to move towards fully inserted position 88. The rotation of rotatable shaft 78 in an opposite second direction causes seal 52 to move towards fully withdrawn position 90. In the exemplary embodiment, seal 52 moves through compressor 18 through a channel 92 defined in casing 28, channel 92 extends between outer casing surface 32 and inner casing surface 30. In one implementation, channel 92 extends substantially tangentially through casing 28 to enable seal 52 to extend from spool 80 to retaining groove 54 (shown in FIG. 3). Alternatively, dynamic sealing device 14 can be any device that enables seal 52 to be moved between fully inserted position 88 and fully withdrawn position 90.

Also, in the exemplary embodiment, dynamic sealing device 14 includes a molding mechanism 94. Molding mechanism 94 is coupled to spool 80 and reshapes a cross-sectional profile of seal body 86 to fit within retaining groove 54 (shown in FIG. 3). More specifically, in one implementation, first end 82 of seal 52 has a first cross-sectional shape, e.g. a rectangle, circle, oval, etc. and second end 84 has a second cross-sectional shape different than the first cross-sectional shape, e.g., without limitation a T shape, and/or an L shape. In the example embodiment, molding mechanism 94 heats seal body 86 to facilitate molding seal body 86 into the cross-sectional shape. Alternatively, dynamic sealing device 14 does not include molding mechanism 94 and seal body 86 is substantially uniform throughout.

Further, in the exemplary embodiment, turbine engine assembly 10 includes a plurality of dynamic sealing devices 14 coupled to a compressor stage 46. More specifically, first end 82 of seal 52 may be coupled to spool 80 of a first dynamic sealing device 14, either directly or through a coupling device that provides a larger clearance gap 50 than seal body 86. Second end 84 of seal 52 may be coupled to spool 80 of a second dynamic sealing device 14, either directly or through a similar coupling device. In such an implementation, first dynamic sealing device 14 may rotate in a first direction to pull first end 82 in the first direction, for example, inserting seal 52. Further, in such an implementation, second dynamic sealing device 14 may rotate in an opposite direction to pull second end 84 in the second direction, for example, removing seal 52.

Also, in at least one embodiment, turbine engine assembly 10 includes a plurality of dynamic sealing devices 14 that insert a plurality of seals 52 into compressor 18 and/or turbine 22.

Figure 5:
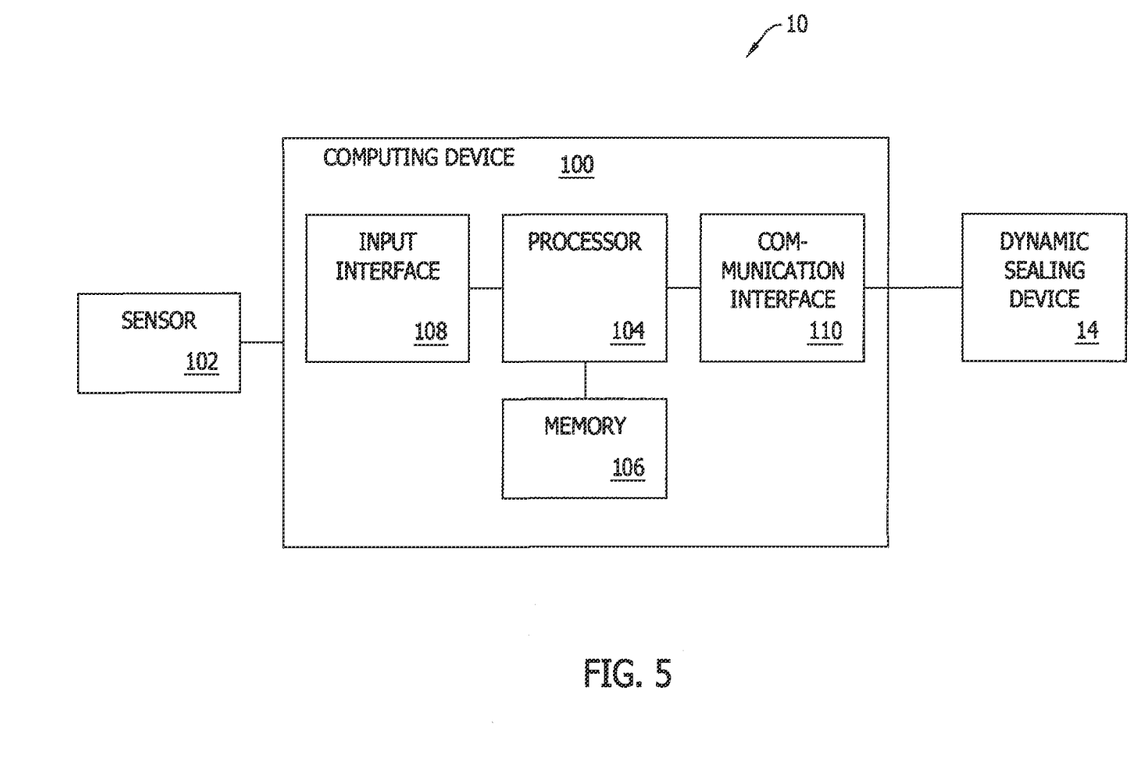
FIG. 5 is a schematic illustration of the turbine engine assembly shown in FIG. 1 including a controller communicatively coupled to the dynamic sealing device.

FIG. 5 is a schematic illustration of turbine engine assembly 10 including a controller 100 communicatively coupled to dynamic sealing device 14 and to at least one sensor 102. Controller 100 includes at least one processor 104 that is coupled to memory device 106 for executing instructions. In some implementations, executable instructions are stored in memory device 106. In the exemplary embodiment, controller 100 performs one or more operations described herein by executing the executable instructions stored in memory device 106. For example, processor 104 may be programmed by encoding an operation as one or more executable instructions in memory device 106 and by providing the executable instructions from memory device 106 to processor 104 for execution.

Processor 104 may include one or more processing units (e.g., in a multi-core configuration). Further, processor 104 may be implemented using one or more heterogeneous processor systems in which a main processor is present with secondary processors on a single chip. In another illustrative example, processor 104 may be a symmetric multi-processor system containing multiple processors of the same type. Further, processor 104 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 106 is one or more devices that enable information, such as executable instructions and/or other data, to be stored and retrieved. Memory device 106 may include one or more computer readable media, such as, without limitation, dynamic random access memory (DRAM), static random access memory (SRAM), a solid state disk, and/or a hard disk. Memory device 106 may be configured to store, without limitation, application source code, application object code, configuration data, threshold settings, and/or any other type of data.

In the exemplary embodiment, controller 100 includes an input interface 108 that is coupled to processor 104. Input interface 108 is configured to receive input from sensor 102. Input interface 108 may include, for example, an antenna, a wireless data port, a wired data port, or any other device capable of receiving data such that the methods and systems function as described herein. In at least some embodiments, input interface 108 receives a manual input from a user. For example, input interface 108 may receive manual instructions to insert and/or remove seal 52 (shown in FIG. 2).

Controller 100, in the exemplary embodiment, includes a communication interface 110 coupled to processor 104. Communication interface 110 communicates with one or more devices, such as dynamic sealing device 14. To communicate with remote devices, communication interface 110 may include, for example, a wired network adapter, a wireless network adapter, an antenna, and/or a mobile telecommunications adapter.

In the exemplary embodiment, sensor 102 is any device that is capable of monitoring the conditions of turbine engine 12. In the exemplary embodiment, sensor 102 determines whether turbine engine 12 is in a start-up condition, a transient condition, a steady-state condition, a shut-down condition, and/or any other condition that enables turbine engine assembly 10 to operate as described herein. In one implementation, sensor 102 may be a plurality of sensors 102.

In operation, controller 100 receives data indicative of the operating condition of turbine engine assembly 10 and selectively controls the operation of dynamic sealing device 14 based on the received data. More specifically, in one implementation, controller 100 controls the activation, speed, and/or direction of rotation of rotatable shaft 78 (shown in FIG. 3). In the exemplary embodiment, controller 100 may cause dynamic sealing device 14 to insert seal 52 during predefined operating conditions of turbine engine 12. More specifically, controller 100 may cause dynamic sealing device 14 to insert seal 52 during a steady-state condition associated with turbine engine 12. In at least one implementation, seal 52 is inserted such that seal surface 74 (shown in FIG. 3) is in light contact with tip 40 (shown in FIG. 3) of rotor blade 38 (shown in FIG. 3) to facilitate reducing clearance gap 50. In another example, controller 100 may cause dynamic sealing device 14 to remove seal 52 during a predefined operating condition, for example, during transient conditions. Alternatively, controller 100 may cause dynamic sealing device 14 to selectively move seal 52 to any point between fully inserted position 88 (shown in FIG. 3) and fully withdrawn position 90 (shown in FIG. 3) during any condition associated with turbine engine 12.

Also in the exemplary embodiment, controller 100 may cause dynamic sealing device 14 to remove seal 52 in response to a manual request. For example, seal 52 may be removed to facilitate replacing seal 52 with a new seal 52.

As will be appreciated based on the foregoing specification, the above-described embodiments of the disclosure may be implemented using computer programming or engineering techniques including computer software, firmware, hardware or any combination or subset thereof, wherein the technical effect is (a) selectively inserting, with a dynamic sealing device, a seal between a plurality of rotor blades that extend radially outward from a rotor disk of a rotor assembly and a casing of a stator assembly that circumscribes the plurality of rotor blades while the turbine engine is in operation, wherein the seal facilitates reducing a clearance gap defined between the plurality of rotor blades and the casing; and (b) selectively removing a seal between the plurality of rotor blades and the casing.

The embodiments of the turbine engine assembly described above facilitate improving an efficiency and/or durability of a turbine engine. More specifically, the turbine engine assembly described above includes a dynamic sealing device that inserts and/or removes a seal from a turbine engine. In some implementations, the seal may be inserted during operation of the turbine engine to facilitate reducing a clearance gap associated with the turbine engine. More specifically, in such implementations, the seal is inserted during a steady-state condition to facilitate reducing a clearance gap as compared to a statically-inserted seal. Accordingly, in some embodiments, a turbine engine assembly with a dynamic sealing device will have improved efficiency in powering a load compared with the statically-inserted seal. Additionally, the dynamic sealing device may remove the seal during transient operations, start-up conditions, and/or during other operating conditions, to facilitate preventing damage to the seal and/or the turbine engine. More specifically, a seal removed during a transient operation will provide enlarge the clearance gap compared to a statically-inserted seal. The enlarged clearance gap provides additional space for the rotor blades to enlarge and/or wobble without damaging the seal or the engine. Accordingly, in some embodiments, a turbine engine assembly with a dynamic sealing device will have improved durability compared with a statically-inserted seal. In addition, the dynamic sealing device may remove the seal in response to a manual request. In such implementations, the dynamic sealing device facilitates replacing the seal without disassembling the turbine. This reduces costs associated with maintaining the turbine engine assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A turbine engine assembly comprising:
a stator assembly;
a rotor assembly comprising a rotor disk coupled to a plurality of rotor blades, said plurality of rotor blades extending radially outward from said rotor disk;
a casing extending at least partially about said plurality of rotor blades to define a clearance gap; and
a dynamic sealing device comprising a rotatable shaft, a spool coupled to said shaft, and a seal coupled to said spool, said dynamic sealing device for selectively rotating said shaft to unwind said seal from said spool for inserting said seal between said casing and said plurality of rotor blades to facilitate reducing the clearance gap defined between said plurality of rotor blades and said casing while said rotor assembly is operating.

2. The turbine engine assembly of claim 1, wherein said dynamic sealing device is operable to selectively rotate said shaft to wind said seal about said spool for removing said seal from between the casing and the plurality of rotor blades to facilitate increasing the clearance gap while said rotor assembly is operating.

3. The turbine engine assembly of claim 1, further comprising a controller and a sensor that measures at least one characteristic of said rotor assembly, said controller configured to:
determine an operational status of said rotor assembly based on the at least one characteristic; and
instruct said dynamic sealing device to insert said seal during a predefined operating condition of said rotor assembly.

4. The turbine engine assembly of claim 3, wherein said controller is further configured to instruct said dynamic sealing device to remove said seal during a second predefined operating condition of said rotor assembly.

5. The turbine engine assembly of claim 1, wherein said casing comprises an inner surface that defines a retaining groove, said retaining groove sized to receive said seal therein.

6. The turbine engine assembly of claim 1 further comprising a plurality of dynamic sealing devices, wherein a first dynamic sealing device is coupled to a first end of said seal and a second dynamic sealing device is coupled to a second end of said seal.

7. The turbine engine assembly of claim 1 further comprising a mold coupled to said dynamic sealing device for reshaping a cross-sectional profile of said seal from a first cross-sectional profile to a second cross-sectional profile.

8. A dynamic sealing device for use in a turbine engine having a plurality of rotor blades and a casing extending at least partially about the plurality of rotor blades to define a clearance gap, said dynamic sealing device comprising a rotatable shaft, a spool coupled to said shaft, and a seal coupled to said spool, said dynamic sealing device for selectively rotating said shaft to unwind said seal from said spool for inserting, during operation of the turbine engine, said seal between the plurality of rotor blades and the casing to facilitate reducing the clearance gap defined between the plurality of rotor blades and the casing.

9. The dynamic sealing device of claim 8, wherein said seal is at least in part flexible.

10. The dynamic sealing device of claim 8, wherein said dynamic sealing device is operable to selectively rotate said shaft to wind said seal about said spool for removing said seal from between the casing and the plurality of rotor blades to facilitate increasing the clearance gap during operation of the turbine engine.

11. The dynamic sealing device of claim 8, wherein said seal comprises a first end, a second end, and a body between said first end and said second end, wherein said first end is coupled to said spool and wherein said body is insertable between the plurality of rotor blades and the casing.

12. The dynamic sealing device of claim 8, wherein the casing defines a retaining groove, said seal being insertable into the retaining groove.

13. The dynamic sealing device of claim 12, wherein said seal has a substantially T-shaped cross-sectional profile when said seal is inserted into the retaining groove, said profile including a radially inner portion, a radially outer portion, and a neck portion extending between said radially inner portion and said radially outer portion.

14. The dynamic sealing device of claim 8 further comprising a mold for reshaping a cross-sectional profile of said seal from a first cross-sectional profile to a second cross-sectional profile.

15. A method for facilitating sealing a turbine engine, said method comprising:

rotating a shaft to unwind a seal from a spool of a dynamic sealing device; and inserting the unwound seal between a plurality of rotor blades and a casing of the turbine engine while the turbine engine is operating, such that the seal facilitates reducing a clearance gap defined between the plurality of rotor blades and the casing.

16. The method of claim 15 further comprising selectively rotating the shaft to wind the seal about the spool for removing, with the dynamic sealing device, the seal from between the casing and the plurality of rotor blades to facilitate increasing the clearance gap during operation of the turbine engine.

17. The method of claim 15 further comprising:

determining, with a controller that is communicatively coupled to the dynamic sealing device, an operational status of the turbine engine; and inserting the seal when the turbine engine is in a predefined operating condition.

18. The method of claim 17, wherein inserting the seal when the turbine engine is in a predefined operating condition includes inserting the seal when the turbine engine is in a steady-state operating condition.

19. The method of claim 15 further comprising:

determining, with a controller that is communicatively coupled to the dynamic sealing device, an operational status of the turbine engine; and removing the seal when the turbine engine is in one of a start-up operating condition, a shut-down operating condition, and a transient operating condition.

20. The method of claim 15 further comprising:

receiving, by a controller communicatively coupled to the dynamic sealing device, an instruction to remove the seal;

removing, with the dynamic sealing device, the seal from between the casing and the plurality of rotor blades; and replacing the seal with a new seal.

* * * * *